United States Patent [19]
Halldorsson et al.

[11] Patent Number: 5,894,489
[45] Date of Patent: Apr. 13, 1999

[54] SOLID-STATE LASER SYSTEM FOR COLOR PICTURE PROJECTION

[75] Inventors: Thorsteinn Halldorsson; Max Koniger; Axel Mehnert, all of Munich; Peter Peuser, Riemerling; Gunter Reithmeier, Putzbrunn; Nikolaus Schmitt; Paul Zeller, both of Munich; Alois Seilmeier, Bayreuth; Heinrich Graener, Halle, all of Germany

[73] Assignee: Daimler-Benz AG, Germany

[21] Appl. No.: 08/894,098

[22] PCT Filed: Feb. 3, 1996

[86] PCT No.: PCT/EP96/00456

§ 371 Date: Nov. 17, 1997

§ 102(e) Date: Nov. 17, 1997

[87] PCT Pub. No.: WO96/25008

PCT Pub. Date: Aug. 15, 1996

[30] Foreign Application Priority Data

Feb. 8, 1995 [DE] Germany .................. 195 04 047

[51] Int. Cl.$^6$ ........................................ H01S 00/00
[52] U.S. Cl. ............................... 372/23; 372/22
[58] Field of Search .................. 372/21–23; 350/328–330

[56] References Cited

U.S. PATENT DOCUMENTS

| | | |
|---|---|---|
| 3,818,129 | 6/1974 | Yamamoto . |
| 5,295,143 | 3/1994 | Rao et al. ................. 372/22 |
| 5,640,405 | 6/1997 | Wallace et al. ............ 372/22 |
| 5,740,190 | 4/1998 | Moulton .................... 372/23 |

*Primary Examiner*—Leon Scott, Jr.
*Attorney, Agent, or Firm*—Evenson, McKeown, Edwards & Lenahan, P.L.L.C.

[57] ABSTRACT

A laser system generates read, green and blue beams from a single laser beam generated by an IR continuous-wave laser using rare-earth or transition elements. Semiconductor diodes are used to excite IR continuous-wave laser and simple passive non-linear frequency conversion is used to generate the red, green and blue effective beams.

18 Claims, 1 Drawing Sheet

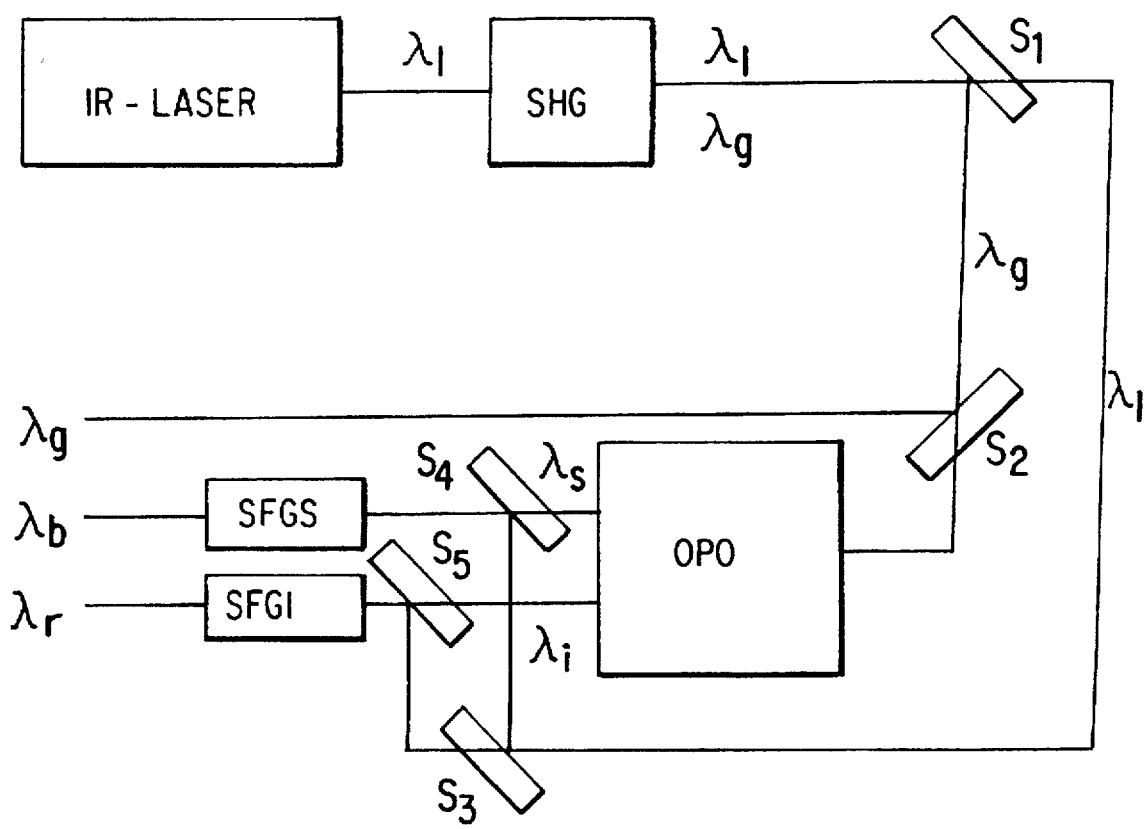

SOLID-STATE LASER SYSTEM FOR COLOR PICTURE PROJECTION

The application relates to a laser system according to the preamble of Claims 1 and 2. Such a laser system is known from International Patent Document WO 91/12556. That document describes the producing of suitable red/green/blue beams by means of at least one—in this case, two—IR continuous-wave lasers (laser diode) in the wavelength range of 850–1,320 nm, in which the colors are obtained by using frequency doubling and summation frequency formation, and an optical parametric oscillator is used for the frequency conversion.

From German Patent Document DE 43 06 797 C1, a laser system for producing the suitable red/green/blue beams for a general color picture projection by means of at least one—in this case, three, lasers is known.

From *Appl. Phys. Lett.* 58 (12), Mar. 25, 1991, pages 1227–1229, a laser system is known for producing the suitable red/green/blue beams for particularly high-resolving laser printers having at least one—in this case, two—IR continuous-wave lasers (laser diode) in the wavelength range of 850 to 1,320 nm, in which the colors are obtained by frequency conversion, specifically by using frequency doubling and summation frequency formation.

From *Appl. Phys. Lett.* 56 (9), Feb. 26, 1990, Page 811–813, a laser system is known for producing the suitable red/green/blue beams for a general color picture projection by means of a single laser.

From *Optics Letters*, Oct. 15, 1990, Vol. 15, No. 20, Page 1129–1131, it is known to use the signal wave as well as the idler wave of an OPO and from *J. Opt. Soc. Am.B.*, Volume 10, No. 11, November 93, Page 2151, it is known to enlarge the tuning range of a light source by combining frequency doubling and/or summation frequency forming steps with a stimulated parametric interaction. Optical parametric oscillators (OPO's) are known, for example, from German Patent Document DE 42 19 169 A1.

The invention is based on the object of further developing a laser system of the initially mentioned type such that it has a high beaming quality with a beam diameter×beam divergence product close to the diffraction limit and has certain colors in the visible wavelength range (RGB) which permit a good overlapping of the color sensitivity range of the human eye by color mixing; has a median optical power of several hundred milliwatts to a few watts and is optimized by a small construction with a good efficiency. All three colors are to be produced in a single laser system with the above-mentioned requirements.

This object is achieved by the measures indicated in Claims 1 and 2. Developments and further developments are indicated in the subclaims and are described in the following by means of embodiments.

In this concept, an efficient IR continuous-wave laser, which uses rare-earth or transition elements, forms the single larger active electro-optical componentry of the system. For reaching the required long life and high efficiency, it is suggested that semiconductor laser diodes be used for exciting the IR continuous-wave laser which operates with rate-earth or transition elements.

The RGB (red, green, blue) effective beams are derived from the IR emission of the IR continuous-wave laser, which operates with rare-earth or transition elements, by means of a simple passive non-linear frequency conversion. By means of the common excitation source for all colors, the complexity of the system is minimized. By means of the intermittent IR continuous-wave laser, which operates with rare-earth or transition elements, of a high pulse peak power, a high efficiency of the frequency conversion is achieved. In the OPO, the intermediate frequencies and thus also the wavelength of the effective radiation can be continuously tuned for the color adaptation.

The FIGURE shows a schematic representation of a possible embodiment of the laser system. The green radiation in the wavelength range of 510–550 nm is obtained by a direct frequency doubling of the radiation of an IR solid-state laser, such as the well-known Nd:YAG laser or related lasers, such as the Nd:YLF or Yb:YAG. From the emission wavelength $\lambda_f = 1.047$ nm (for example, for the Nd:YLF), the suitable line is formed at $\lambda_g = 524$ nm. After passing through the frequency doubler (SHG), the beam consists of a mixture of the two wavelengths of the IR radiation and of the green radiation.

By means of a dichroitic beam splitter (S1), the two beams of different wavelengths are separated from one another. In another beam splitter (S2), the green effective beam part is then split off. The second part of the green beam, which is used as a pumping beam of the wavelength $\lambda_g$ for the OPO, is converted there at a high efficiency into a signal beam of the wavelength $\lambda_s$ and an idler beam of the wavelength $\lambda_i$. By the selection of a suitable crystal orientation and/or crystal temperature of the non-linear crystal in the OPO, the output wave lengths $\lambda_s$ and $\lambda_i$ can be determined (taking into account the energy maintenance condition $\omega_g = \omega_s + \omega_i$)

The IR beam of the laser is divided by means of a beam splitter (S3); the signal and idler beam respectively is then superimposed on the two partial beams by means of two dichroitic mirrors (S4 and S5); and a mixing then takes place at a high efficiency in non-linear crystals (SFGS and SFGI).

Frequencies $\omega_s$ and $\omega_i$ are selected such that the sum of their frequencies with the frequency of the fundamental wave of the IR laser $\omega_f$ result in the frequencies of the required colors blue, $\omega_b = \omega_f + \omega_i$, or red, $\omega_r = \omega_f + \omega_s$, in the required wavelength ranges.

By using an Nd:YLP laser with the IR fundamental wavelength $\lambda_f = 1.047$ nm, by means of this construction, for example the following suitable RGB wavelengths may be produced:

$\lambda_r = 620$ nm $\lambda_g = 524$ nm $\lambda_b = 450$ nm

In this case, the signal and idler wavelengths of the OPO would be $\lambda_s = 789$ nm $\lambda_i = 1,520$ nm As further embodiments of the invention, it is possible by means of a laser wavelength in a shorter-wave range (860–920 nm) to first produce the blue wavelength in the wavelength range of 430–460 nm by frequency doubling and to use the remaining laser wave for the pumping of the OPO and then subsequently produce the other colors green and red by a frequency mixing of the IR laser radiation with the signal or idler radiation, as before.

Another possible variant would be the use of the IS laser radiation for the pumping of the OPO's and the frequency mixing of the frequency-doubled or tripled IR radiation with the signal or the idler radiation for producing the additional two colors.

The requirement of optical power or the overall efficiency for such a system in practice can be estimated as follows: By means of 40 W of medium power at $\lambda_f = 1.047$ μm, 12 W of medium power at $\lambda_g = 524$ nm can be generated. An efficiency of 30% for the frequency doubling is achieved in light-pumped, mode-coupled high-power lasers. Because of the improved radiation quality, efficiencies of up to 50% in diode-pumped systems appear conceivable and were demonstrated by means of lower powers (G. P. A. Malcolm, M. Ebrahimzade, A. I. Ferguson "Efficient Frequency Conversion of Mode-Locked Diode-Pumped and Tunable All-Solid-State Laser Sources", *IEEE J. Quant. Electr.* 28 (1992) 1172). Photon conversion efficiencies of 30% respectively in the signal and idler beam are expected in an OPO so that approximately 2.6 W or 1.4 W are available at the wavelengths $\lambda_s$=789 nm and $\lambda_i$=1,520 nm. The summation frequency production with the remaining, very intense radiation of the wavelength $\lambda_i$ (20–30 W) permits a quantum efficiency of approximately 30%, which results in output powers of 1–2 W for the red and the blue effective radiation.

The optical efficiency during the conversion of the pumping diode radiation into the primary IR laser radiation today amounts to typically 30–40%; the electric-optical efficiency of the pumping diode is 30–50%. The total electric-optical efficiency of several percent should therefore be achievable.

As non-linear crystals for the frequency doubling in the OPO and for the summation or difference frequency production, in principle, all efficient non-linear materials can be used, such as potassium titanyl phosphate (KTP) or beta barium borate (BBO), lithium triborate (LBO), potassium titanyl arsenate, potassium and lithium niobate or lithium iodate. In principle, polymers with high non-linear coefficients can also be used.

Basically the frequency conversion processes described here can be implemented by means of a laser radiation with continuous waves as well as by means of a pulsed laser radiation. Since the efficiency of these processes in a first approximation is proportional to the output density of the radiation, a considerable advantage exists here in the use of pulsed systems of a high pulse peak output, as offered by mode-coupled lasers.

According to today's state of the art, the achieving of a comparable overall efficiency in continuous-wave systems is considerably more difficult, more complex and more cost-intensive.

When pulsed systems are used for the picture projection with a fast deflection of the laser beam over the picture surface and the simultaneous modulation of the radiation intensity of the three collinear RGB-beams, it is necessary for the pulse repetition frequency of the laser to be at least equal to or higher than the picture point frequency (pixel frequency). According to the used projection standard, this is in the range of from 10–100 MHz.

Mainly the mode-coupled continuous-wave lasers are suitable for this high pulse frequency. An active mode coupling can be used, for example, by means of acousto-optical modulators, or a passive mode coupling can be used with suitable fadable materials within the resonator, for achieving the high pulse frequency. With an optical length of the resonator of $L_o$, the following is obtained as the pulse repetition frequency f of the mode-coupled laser:

$$f = c/2L_o,$$

wherein c is the speed of light in the vacuum. For achieving 100 MHz, the optical length must be $L_o$=150 cm, and for achieving 1 GHz, it must be $L_o$=15 cm. The used pulse repetition frequency will depend on the application case. However, it will be advantageous to select the pulse repetition frequency to be clearly higher than the picture point frequency, so that possible frequency, phase or intensity fluctuations will influence the quality of the picture reproduction as little as possible.

Mainly the diode-pumped lasers of the rare earths, such as neodymium and ytterbium or transition metals, such as titanium or chromium, are suitable as mode-coupled IR lasers for these applications. The future will probably provide other candidates for efficient continuous-wave lasers in the particularly suitable spectral range of from 850 to 1,320 nm. For this application, linearly constructed crystal lasers, ring lasers as well as fiber glass lasers doped with these laserable ions would be suitable.

Arrangements in which the pulsed beam is focussed directly without additional optical accessory devices in the frequency doubler crystal are suitable for the frequency doubling. In the case of mode-coupled lasers, an efficiency of the frequency doubling up to 50% can already be reached.

External resonators may also be used for improving the efficiency by increasing the dwell time of the IR wave in the frequency doubler. Linear resonators as well as ring resonators are suitable for this purpose. These two resonator structures may also be used in the case of the optically parametric oscillator. The summation frequency is preferably generated in a non-linear crystal without additional optical accessories.

For increasing the efficiency, arrangements should also be considered in which individual frequency conversion steps take place within a resonator (intracavity).

We claim:

1. A Laser system for producing red/green/blue beams from an IR continuous-wave laser of the wavelength range of 850 to 1,320 nm by means of frequency mixing and one of frequency doubling and frequency shifting in an optical parametric oscillator, wherein:

for a general color picture projection, a single mode-coupled IR continuous-wave laser is used which operates with rare-earth elements or transition metals; and after frequency doubling of a part of the IR radiation, a portion of the frequency-doubled radiation is used directly for the picture projection, and another portion of the frequency-doubled radiation is used as pumped radiation for an optical parametric oscillator (OPO) which produces intermediate frequencies as a signal and an idler wave which, after a frequency mixing with a remaining part of the IR radiation in one non-linear crystal respectively produce the two remaining colors.

2. A Laser system according to claim 1 wherein the colors red/blue/green are produced in the wavelength ranges of 620–630 nm, 510–520 nm, 440–460 nm respectively.

3. A Laser system according to claim 2 wherein a pulse frequency of the mode-coupled laser is at least equal to a pixel frequency of a picture projection.

4. A Laser system according to claim 1 wherein a median power of the individual red/blue/green beams is determined based on a required size of the projection surface, intensity of background lighting and required brightness of a picture surface.

5. A Laser system according to claim 4 wherein a pulse frequency of the mode-coupled laser is at least equal to a pixel frequency of a picture projection.

6. A Laser system according to claim 1 wherein a pulse frequency of the mode-coupled laser is at least equal to a pixel frequency of a picture projection.

7. A Laser system for producing red/green/blue beams from an IR continuous-wave laser of the wavelength range of 850 to 1,320 nm by means of frequency mixing and one of frequency doubling and frequency shifting in an optical parametric oscillator, wherein:

for a general color picture projection, a single mode-coupled IR continuous-wave laser is used which operates with rare-earth elements or transition metals;

after frequency doubling of a part of the IR radiation, a portion of the frequency-doubled radiation is used directly for picture projection;

a remaining portion of the IR radiation which not frequency-doubled, is used as pumped radiation for the optical parametric oscillator (OPO); and a remaining portion of the frequency-doubled radiation is combined respectively with a signal wave and an idler wave generated by the optical parametric oscillator to produce in one non-linear crystal respectively two additional colors by means of frequency mixing.

8. A Laser system according to claim 7 wherein the colors red/blue/green are produced in the wavelength ranges of 620–630 nm, 510–520 nm, 440–460 nm respectively.

9. A Laser system according to claim 7 wherein a median power of the individual red/blue/green beams is determined based on a required size of the projection surface, intensity of background lighting and required brightness of a picture surface.

10. A Laser system according to claim 7 wherein a pulse frequency of the mode-coupled laser is at least equal to a pixel frequency of a picture projection.

11. Method of generating red, green and blue laser beams, comprising:

using a single mode coupled IR continuous wave laser to generate IR laser radiation having a first wavelength;

passing said IR laser radiation through a frequency doubler to generate radiation;

inputting, which comprises a mixture of said first wavelength and a second wavelength;

separating said radiation having said first wavelength from radiation having said second wavelength;

using a portion of said radiation having said second wavelength directly as one of said red, green and blue laser beams;

using another portion of said radiation having said second wavelength as pumped radiation input to an optical parametric oscillator which generates intermediate frequencies as a signal wave and an idler wave;

mixing said signal wave and said idler wave respectively with said IR laser radiation to generate the remaining two of said red, green and blue laser beams.

12. Method according to claim 11 wherein said continuous wave laser operates with a material selected from the group consisting of rare-earth elements and transition metals.

13. Method according to claim 12 wherein said IR laser radiation has a wavelength in a range of from 850 to 1,320 nm.

14. Method according to claim 11 wherein said mixing step is performed by means of nonlinear crystals.

15. A Laser system for generating red, green and blue laser beams, comprising:

a single mode coupled IR continuous wave laser which generates laser IR radiation having a first wavelength;

a frequency doubler coupled to receive said laser IR radiation and generate output radiation which comprises a mixture of said first wavelength and a second wavelength;

a first beam splitter which separates wavelengths into separate beams said output radiation of said frequency doubler into separate laser beams having said first and second wavelengths, respectively;

an output which provides a first portion of said laser beam having said second wavelength directly as one of said red, green and blue laser beams;

an optical parametric oscillator which receives a remaining portion of said laser beam having said second wavelength and generates intermediate frequencies as a single wave and an idler wave, respectively;

first and second optical mixing elements coupled to receive said signal wave and said idler wave, respectively, and mix them with portions of said IR radiation to generate the remaining two of said red, green and blue laser beams.

16. A Laser system according to claim 15 wherein said continuous wave laser operates with a material selected from the group consisting rare-earth elements and transition metals.

17. A Laser system according to claim 16 wherein said IR laser radiation has a wavelength in a range of from 850 to 1,320 nm.

18. A Laser system according to claim 15 wherein said optical mixing elements comprise nonlinear crystals.

* * * * *